United States Patent
Bell et al.

(10) Patent No.: US 9,207,767 B2
(45) Date of Patent: *Dec. 8, 2015

(54) GUIDE MODE FOR GESTURE SPACES

(75) Inventors: Denise A Bell, Austin, TX (US); Travis M Grigsby, Austin, TX (US); Jana H Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/172,552

(22) Filed: Jun. 29, 2011

(65) Prior Publication Data
US 2013/0007614 A1    Jan. 3, 2013

(51) Int. Cl.
G06F 3/01 (2006.01)

(52) U.S. Cl.
CPC ............... *G06F 3/017* (2013.01); *G06F 3/011* (2013.01)

(58) Field of Classification Search
CPC ... G06F 3/011; G06F 3/0481; G06F 3/04895; G06F 3/04883; G06F 3/017; G06F 9/4446
USPC ......................................... 715/709, 708, 863
See application file for complete search history.

(56) References Cited

U.S. PATENT DOCUMENTS

| | | | |
|---|---|---|---|
| 6,215,890 B1 | 4/2001 | Matsuo et al. | |
| 6,675,216 B1 * | 1/2004 | Quatrano et al. | 709/229 |
| 7,331,929 B2 * | 2/2008 | Morita et al. | 600/558 |
| 7,365,737 B2 | 4/2008 | Marvit et al. | |
| 7,770,136 B2 * | 8/2010 | Beeck et al. | 715/863 |
| 8,181,123 B2 * | 5/2012 | Stone-Perez et al. | 715/863 |
| 8,287,373 B2 * | 10/2012 | Marks et al. | 463/36 |
| 8,323,106 B2 * | 12/2012 | Zalewski | 463/31 |
| 8,334,842 B2 * | 12/2012 | Markovic et al. | 345/158 |
| 2002/0056003 A1 * | 5/2002 | Goswami | 709/227 |
| 2005/0210417 A1 | 9/2005 | Marvit et al. | |
| 2005/0212751 A1 | 9/2005 | Marvit et al. | |
| 2008/0120577 A1 * | 5/2008 | Ma et al. | 715/863 |
| 2009/0116742 A1 * | 5/2009 | Nishihara | 382/173 |
| 2009/0221368 A1 * | 9/2009 | Yen et al. | 463/32 |
| 2010/0146455 A1 * | 6/2010 | Wilson et al. | 715/860 |
| 2010/0234094 A1 | 9/2010 | Gagner et al. | |
| 2010/0281437 A1 * | 11/2010 | Stone-Perez et al. | 715/863 |
| 2011/0035666 A1 * | 2/2011 | Geisner et al. | 715/709 |
| 2011/0119216 A1 * | 5/2011 | Wigdor | 706/46 |
| 2011/0296353 A1 * | 12/2011 | Ahmed et al. | 715/848 |

(Continued)

OTHER PUBLICATIONS

Hansen "Building A Better Computer Mouse" CNET News, (2002), 6 pages. Available at http://news.cnet.com/2100-1023-960408.html, last accessed Jun. 29, 2011.

(Continued)

*Primary Examiner* — Kieu Vu
*Assistant Examiner* — Asteway T Gattew
(74) *Attorney, Agent, or Firm* — Jeffrey T. Holman (57) ABSTRACT

A gesture system executes actions or commands based on gesture inputs. The system includes a detection subsystem and a gesture processing device. The detection subsystem monitor a plurality of gesture spheres, including a participant gesture sphere and a guide gesture sphere. The participant gesture sphere corresponds to a first user and a participant domain on a display device. The guide gesture sphere corresponds to a second user. The gesture processing device implements a guide mode to execute an action within the participant domain based on a gesture from the guide gesture sphere.

18 Claims, 5 Drawing Sheets

(56) References Cited

U.S. PATENT DOCUMENTS

| | | | |
|---|---|---|---|
| 2012/0063637 A1* | 3/2012 | Tardif | 382/103 |
| 2012/0121185 A1* | 5/2012 | Zavesky | 382/195 |
| 2012/0133579 A1* | 5/2012 | Prieur et al. | 345/156 |
| 2012/0144348 A1* | 6/2012 | Stone-Perez et al. | 715/863 |
| 2012/0206348 A1* | 8/2012 | Kim et al. | 345/158 |
| 2013/0173531 A1* | 7/2013 | Rinearson et al. | 707/608 |

OTHER PUBLICATIONS

Lifrieri "Apple Patent Shows Motion Sensing Technology for Future 4th Generation iPhone", (2010), 4 pages. Available at http://www.mobilemag.com/2010/02/28/apple-patent-shows-motion-sensing-technology-for-future-4th-generation-iphone/, last accessed Jun. 29, 2011.

* cited by examiner

GUIDE MODE FOR GESTURE SPACES

BACKGROUND

The rising prevalence of small computing devices coupled with the general aging of the population, has resulted in a higher demand for dexterity and fine motor control in interfacing with these devices among a population whose dexterity and fine motor control are limited. Gesture systems may be implemented in computing devices to create a friendlier user environment and allow users to more easily navigate various applications within the user environment. Particularly, computing devices such as phones or workstations with smaller and increasingly improved technology, such as touch screens or multi-touch surfaces, may also have increasingly small, intricate, and complex user interfaces or input surfaces. Gesture systems generally allow a user to input a command or information into a computing device through gestures thus removing the need to tap or touch small icons or input areas in order to perform certain tasks within a given application or environment. Some conventional gesture systems may also be adjusted or customized by the user to fit specific limitations of motion or dexterity.

Some gesture systems are able to provide instruction to a beginning user in a manner which teaches the user how to interface with the gesture system and which actions correspond to each gesture. Some conventional systems are able to provide general instruction or training with images or video files, but may be unable to provide specific examples and training for the user's specific needs. Training, aid, or correction given by conventional gesture systems may be random or may not be given specifically when needed, such that conventional gesture systems may not be as useful as a user may need in a particular situation.

SUMMARY

Embodiments of a system are described. In one embodiment, the system is a gesture system to execute actions or commands based on gesture inputs. An embodiment of the system includes a detection subsystem and a gesture processing device. The detection subsystem monitor a plurality of gesture spheres, including a participant gesture sphere and a guide gesture sphere. The participant gesture sphere corresponds to a first user and a participant domain on a display device. The guide gesture sphere corresponds to a second user. The gesture processing device implements a guide mode to execute an action within the participant domain based on a gesture from the guide gesture sphere. Other embodiments of the gesture system are also described. Embodiments of methods and computer program products are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments facilitate implementation of parallel gesture spaces, or spheres, for a computer device which accepts user gestures as input. In some embodiments, the implementation of parallel gesture spaces makes it possible for a user to allow another person to demonstrate how to effectively perform gesture inputs or to guide the user through an application using gesture inputs. In some embodiments, a specific guide mode can be implemented in which a guide gesture sphere provides a second user (i.e., a guide) with the ability to work collaboratively or in a supervisory capacity with a first user (i.e., a participant) operating in a participant gesture sphere.

For reference, the term "sphere" is used herein to describe one example of the region or space in which gestures may be detected. However, embodiments described herein are not limited with gesture regions or spaces that are spherical or spheroidal in geometry. Other embodiments may implement gesture spaces which are representative of different three-dimensional objects, or spaces which are substantially irregular.

Figure 1:
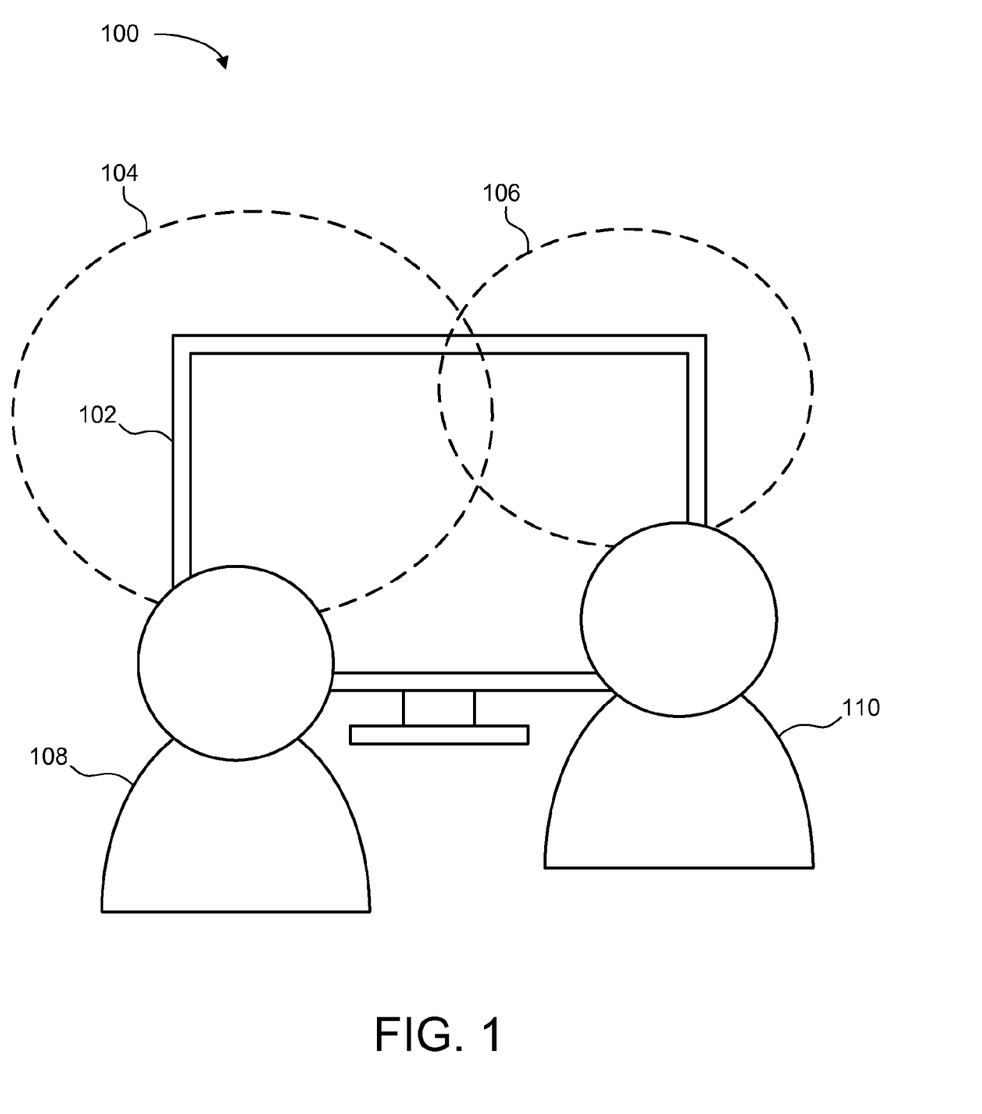
FIG. 1 depicts an illustrated diagram of one embodiment of a gesture environment.

FIG. 1 depicts an illustrated diagram of one embodiment of a gesture environment 100. In general, the gesture environment 100 implements hardware and software to process gesture inputs to a computer device. Although the gesture environment 100 is shown and described with certain components and functionality, other embodiments of the gesture environment 100 may include fewer or more components to implement less or more functionality.

The illustrated gesture environment 100 includes a display device 102. The display device 102 allows a user to see representations of the gesture inputs. For example, if a gesture input corresponds to movement of a cursor (not shown) within a graphical user interface (GUI) (refer to FIG. 2) depicted on the display device 102, then the display device 102 can show the cursor moving according to the gesture input. Similarly, the display device 102 can provide a graphical representation of a gesture input to select an icon or other reference object displayed within the GUI. In general, the display device 102 provides visual feedback, where applicable, for gesture inputs that are received and processed within the gesture environment 100. In some embodiments, the display device 102 is a computer monitor. In other embodiments, the display device 102 may be a television screen or a display screen of a phone, a digital assistant, or another mobile device or other intelligent device. Various types of display devices with different sizes and different types of display capabilities are contemplated for implementation within embodiments of the gesture environment 100.

The illustrated gesture environment 100 also includes a participant gesture sphere 104 and a guide gesture sphere 106. A participant user 108 is approximately aligned with the participant gesture sphere 104 to provide gesture inputs that are recognized and processed to perform corresponding actions on the display device 102 and/or within an application that is running on the associated computer device (refer to FIG. 3). Similarly, a guide user 110 is approximately aligned with the guide gesture sphere 106 to provide gesture inputs.

Each gesture sphere 104 and 106 may be characterized by corresponding gesture sphere properties which define the size, location, and other features of the respective gesture spheres 104 and 106. For example, in some embodiments the gesture spheres 104 and 106 are approximately the same size. Alternatively, the gesture spheres 104 and 106 may be different sizes. In some embodiments, the locations of the gesture spheres 104 and 106 partially overlap (as shown in FIG. 1). Alternatively, the locations of the gesture spheres 104 and 106 may be separated by an intermediate space (not shown), so that the gesture spheres 104 and 106 do not overlap. Additionally, the gesture spheres 104 and 106 may be approximately the same three-dimensional shape or, alternatively, may be different shapes. These and other features or properties of the individual gesture spheres 104 and 106 may depend on the imaging capabilities of imaging device(s) used to monitor and detect gestures from the users 108 and 110. For example, the imaging capabilities of the imaging device(s) may be constrained by certain physical properties (e.g., fixed focal length or zooming capabilities) or by software controls (e.g., partitioning different pixel groupings for different gesture spheres 104 and 106). Various types of imaging devices with different types of imaging capabilities are contemplated for implementation within embodiments of the gesture environment 100.

In some embodiments, the gesture environment 100 allows the users 108 and 110 to configure certain properties of their respective gesture spheres 104 and 106. By allowing such configuration, users may be able to customize the manner in which the users interface with the display device 102, for example in situations where movement or perception challenges of some users may hinder the use of conventional input schemes. For example, if a user has difficulty with fine motor control for interfacing with small icons or input areas, the user's gesture sphere and/or gesture inputs may be customized to allow for gesture inputs and/or gesture locations which are within the user's capacities.

Additionally, in some embodiments the gesture environment 100 allows the guide user 110 to configure the guide gesture sphere 106 to enable the guide user 110 to interact with the display device 102 in a manner that is collaborative with the participant user 108. This type of collaborative configuration may facilitate the guide user 110 to provide gesture guidance or instruction for the participant user 108. For example, the guide user 110 may be training the participant user 108 on the operation of the display device 102, in which case the guide user 110 may show the participant user 108 an example of a gesture by performing the gesture within the guide gesture sphere 106, and the participant user may see the corresponding action or result on the display device 102. The guide user 110 then may supervise a repetition of the same gesture by the participant user 108 within the participant gesture sphere 104 to achieve a similar action or result on the display device 102. In this manner, the gesture environment 100 may allow for visual demonstration, teaching, training, etc.

Embodiments of the gesture environment 100 facilitate the parallel operation of the gesture spheres 104 and 106 to provide a guide mode which allows the guide user 110 to configure the guide gesture sphere 106 to override or interrupt a separate gesture input by the participant user 108. In some embodiments, the guide mode may be activated to allow the guide user 110 to completely override the input of the participant user 108. In another embodiment, the guide mode may allow the guide user 110 to simultaneously overlay an action on the display device 102 with that of the participant user 108. In another embodiment, the guide user 110 may directly modify the action executed by the participant user 108. Other embodiments may allow the guide user 110 other types of interaction with an input of the participant user 108.

Figure 2:
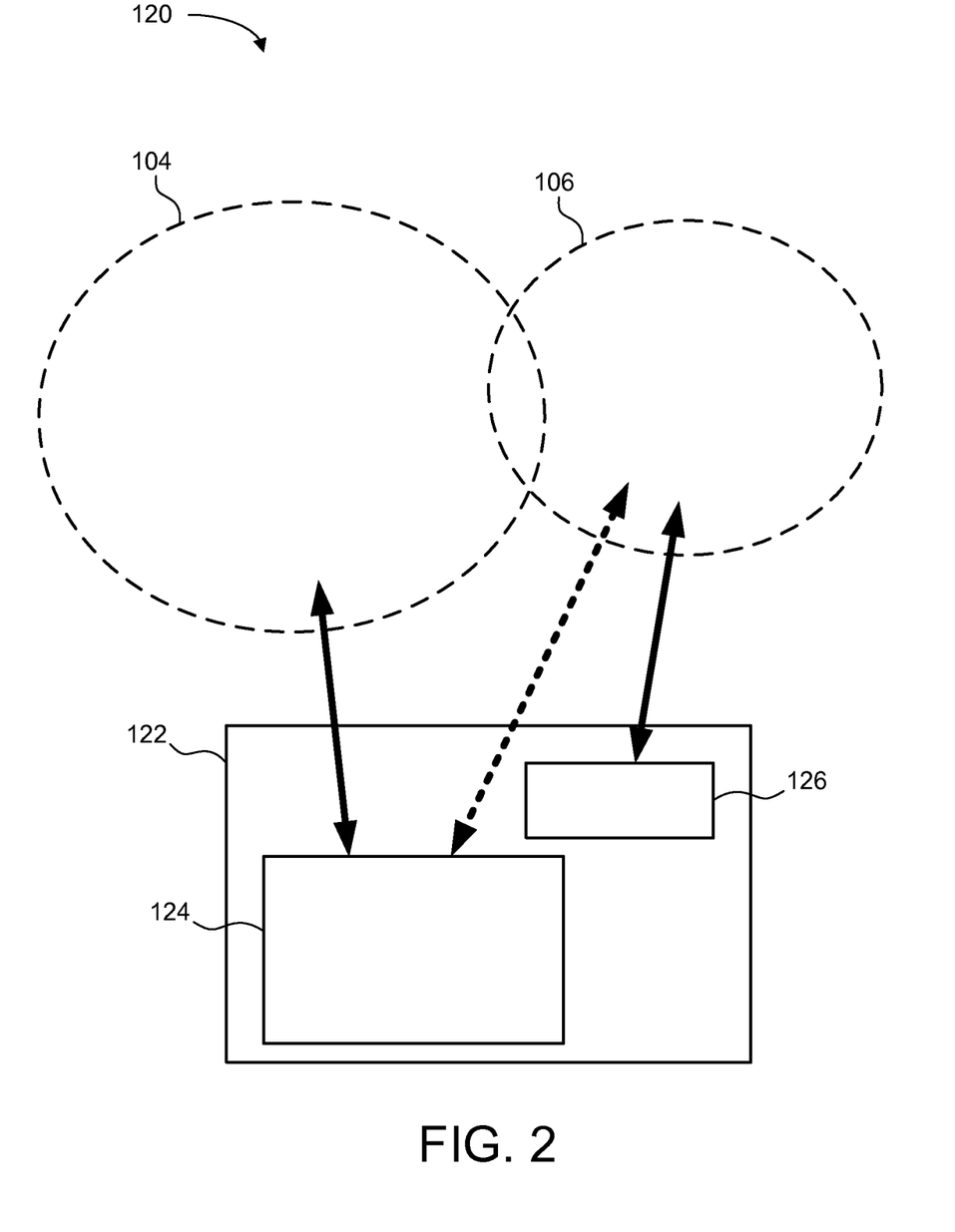
FIG. 2 depicts a schematic diagram of one embodiment of a correlation 120 between gesture spheres and applications on a GUI.

FIG. 2 depicts a schematic diagram of one embodiment of a correlation 120 between gesture spheres 104 and 106 and gesture domains 124 and 126 on a GUI 122. The illustrated embodiment includes the participant gesture sphere 104, the guide gesture sphere 106, and corresponding gesture domains (or application spaces) 124 and 126 that might be displayed within a GUI 122 on the display device 102.

As illustrated, the participant gesture sphere 104 may be configured to provide gesture inputs for interfacing with a first domain 124. For reference, the first domain 124 corresponding to the participant gesture sphere 104 is also referred to as the participant domain. Similarly, the guide gesture sphere 106 may be configured to provide gesture inputs for interfacing with a second domain 126 that is separate from the participant domain 124. For reference, the second domain 126 corresponding to the guide gesture sphere 106 is also referred to as the guide domain. In this way, different users can individually and independently interact with separate domains 124 and 126 within the GUI 122 (or within separate GUIs) and, more specifically, interface with separate applications operating in the separate domains 124 and 126.

In some embodiments, more than one user may be allowed to access the same domain or application space within the GUI 122. For example, when operating in the guide mode the guide user 110 may input gestures at the guide gesture sphere 106 to initiate one or more actions within the participant domain 124 that otherwise corresponds to the participant gesture sphere 104. Thus, the participant domain 124 may be subject to inputs from the participant user 108 and the guide user 110 simultaneously, or at substantially the same time. In contrast, in some embodiments, it may be possible to configure the guide domain 126 corresponding to the guide gesture sphere 106 so that the participant user 108 cannot initiate actions for the guide domain 126.

Additionally, in the guide mode the guide user 110 may provide gesture inputs at the guide gesture sphere 106 to implement actions which override or supersede gesture inputs from the participant user. And in further embodiments, the guide user 110 may be able to provide gesture inputs at the gesture sphere 106 to control whether or not gesture inputs at the participant gesture sphere 104 might be monitored or implemented at all.

Figure 3:
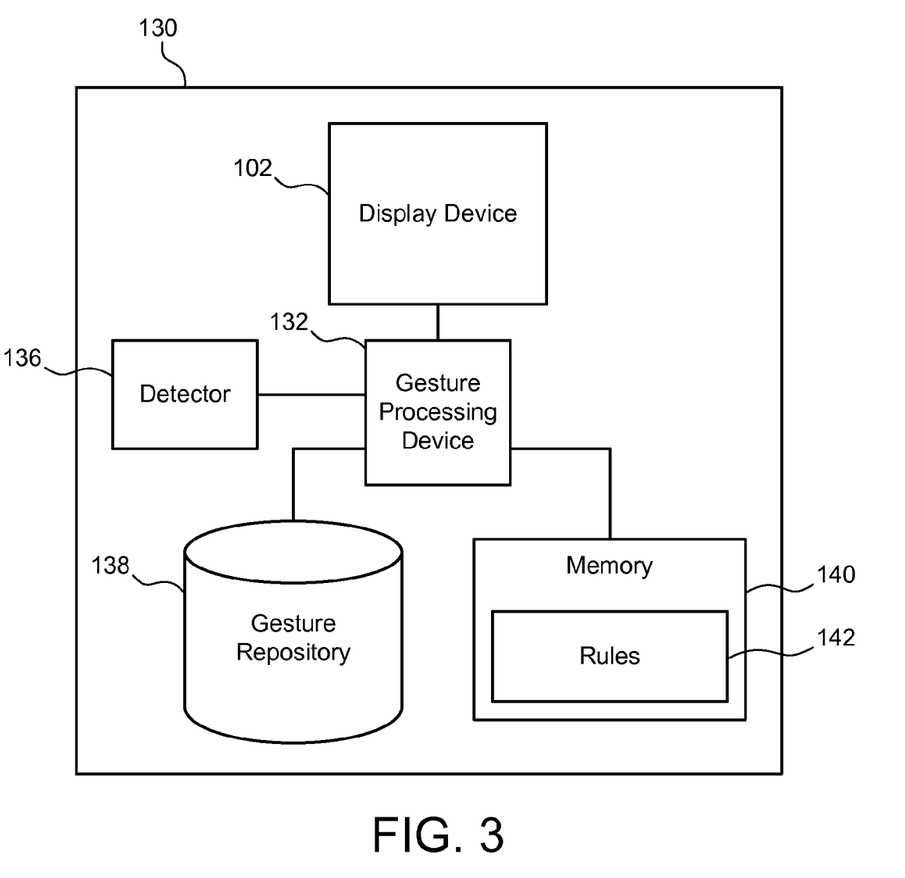
FIG. 3 depicts a schematic diagram of one embodiment of a gesture system for use in the gesture environment of FIG. 1.

FIG. 3 depicts a schematic diagram of one embodiment of a gesture system 130 for use in the gesture environment 100 of FIG. 1. In general, the gesture system 100 includes physical hardware components to implement one or more computer programs, including at least some of the software instructions for implementation of the guide mode and other functionality described herein. The illustrated embodiment of the gesture system 130 includes the display device 102, a gesture processing device 132, a detector 136, a gesture repository 138, and an electronic memory device 140.

Figure 4:
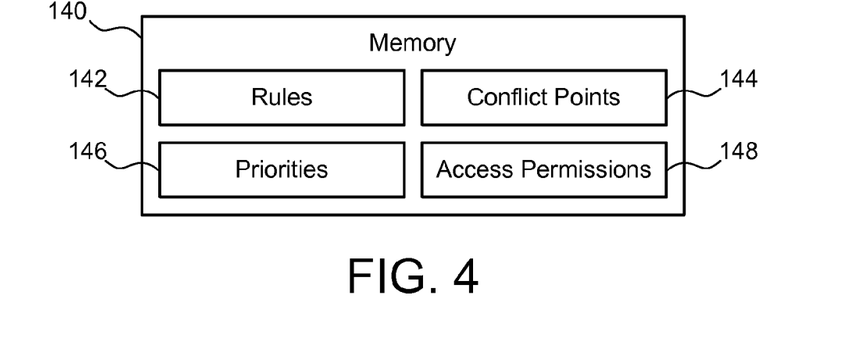
FIG. 4 depicts a schematic diagram of one embodiment of the electronic memory device of FIG. 3.

Although the gesture system 130 is shown and described with certain components and functionality, other embodiments of the gesture system 130 may include fewer or more components to implement less or more functionality. For example, although only a single detector 136 is shown in FIG. 4, other embodiments of the gesture system 130 may include multiple detectors 136 (e.g., one for each gesture sphere 104 and 106). Additionally, although the illustrated gesture system 130 portrays all of the depicted components within a single package, in other embodiments at least some of the individual components may be implemented in independent packages or devices. For example, the display device 102 may be implemented separately from other components within the gesture system 130. Communications between any two or more components which are implemented in separate packages or devices may be accomplished by any known wired, wireless, or other communications channels and corresponding protocols.

In one embodiment, the detector 136 monitors at least one gesture sphere for a gesture input from a user. The detector 136 may be any form of device that is capable of detecting a user's gestures. In some embodiments, the detector 136 may include one or more imaging devices to generate signals representative of a visual scene that is imaged over time. As a user moves within the imaged scene, sequential images of the scene may be processed and compared to determine which gesture the user might be making. In another embodiment, the detector 136 may include an infrared (IR) sensor which detects IR wavelengths, rather than light within the visible wavelength spectrum. Other embodiments may use another type of detector 136 such as sensors which physical attach to, for example, a users arm or hand or which is manipulated in free space by a user. Various types of detectors with different types of detection capabilities are contemplated for implementation within embodiments of the gesture system 130.

In some embodiments, separate dedicated detectors 136 may be used to independently detect gesture inputs from different gesture spheres. Using separate dedicated detectors 136 may provide a relatively high level of sensitivity and accuracy of the gesture system 130. In other embodiments, multiple gesture spheres may be monitored by a single detector 136, which may provide a cost-effective implementation in terms of production costs, package size, and/or energy consumption. In other embodiments, the detector 136 for one or more gesture spheres also may be capable of detecting other inputs or performing additional functions such as, for example, video conferencing or other video or still image inputs.

In some embodiments, the gesture system 130 recognizes overlapping gesture spheres 104 and 106, or gesture collisions of the participant gesture sphere 104 and the guide gesture sphere 106. In some embodiments, the gesture system 130 executes an action based on the detection of a collision. In some embodiments, the action may include displaying an error message, prompting a redefinition of one or more of the spheres 104 and 106, executing a distinct action based upon at least a portion of a gesture detected within the overlapping space. In other embodiments, the gesture system 130 treats the collision as a normal gesture region for either of the spheres 104 and 106 in the collision. Other embodiments include other functionality upon detection of a collision between the gesture spheres 104 and 106.

Upon detection of a gesture input, the detector 136 sends corresponding signals to the gesture processing device 132. The gesture processing device 132 receives gesture inputs, or representative electronic signals representative of gesture inputs 132, that are detected by the detector 136. The gesture processing device 132 is connected to the gesture repository 138. Upon receipt of the communication from the detector 136, the gesture processing device 132 searches the gesture repository 138 for an action corresponding to the gesture perceived by the detector 136.

The gesture processing device 132 is also connected to the memory 140. The memory 140 includes rules 142, which are described in more detail below with reference to FIG. 5. In one embodiment, the rules 142 include at least one instruction or parameter related to detection of a gesture input and execution of an action corresponding to the gesture input. The gesture processing device 132 checks the memory 140 for rules 142 which correspond to the gesture input or the action found in the gesture repository 138.

Based on the result of the signals, actions, and rules available to the gesture processing device 132, the gesture processing device 132 may send display signals to the display device 102 to display an action corresponding to the gesture input from the user. The display device 102 then displays the action associated with the gesture input detected by the detector 136. Other embodiments of the gesture system 130 may perform the processes in another order or with fewer or more processes or components.

FIG. 4 depicts a schematic diagram of one embodiment of the electronic memory device 140 of FIG. 3. The memory 140 may be implemented in any type of electronic data storage or memory device capable of at least temporarily storing a charge, signal, or other representation of data for a period of time. The memory 140 may be volatile or non-volatile. Various types of memory with different types of data storage or retention capabilities are contemplated for implementation within embodiments of the gesture system 130.

In some embodiments, the memory 140 includes rules 142, conflict points 144, priorities 146, and access permissions 148. Other embodiments may include fewer or more types of stored data. As one example, the memory 104 may store parameters and/or instructions that may be used to calibrate the size, shape, or other properties of the gesture spheres 104 and 106. In other embodiments, some of the stored data and/or instructions described herein may be distributed on multiple memory devices 140.

As mentioned above, the rules 142 include at least one instruction or parameter related to detection of a gesture input and execution of an action corresponding to the gesture input.

In one embodiment, the conflict points 144 include instructions for managing conflicting gestures from one or more gesture spheres 104 and 106. For example, if the guide user 110 and the participant user 108 attempt to perform different, conflicting actions at approximately the same time, or within a certain specified or default time period, then the conflict points 144 may be referenced to determine which gesture input to recognize, which gesture input to ignore or delay, and whether to provide any additional feedback to the user(s). In other embodiments, the conflict points 144 include instructions for handling gestures that occur in an overlapping space between otherwise separate gesture spheres 104 and 106.

In one embodiment, the priorities 146 include instructions for giving preference to a gesture input detected in one sphere over a gesture input detected in another. For example, the priorities 146 may indicate that a gesture input detected in the guide gesture sphere 106 should be given priority over a gesture input detected in the participant gesture sphere 104. Other embodiments of the priorities 146 may include instructions for other situations.

In one embodiment, the access permissions 148 include parameters for levels of access for certain actions. The access permissions 148 also may include profiles and login information stored to identify the user as a guide, participant, or other status with corresponding permissions.

Figure 5:
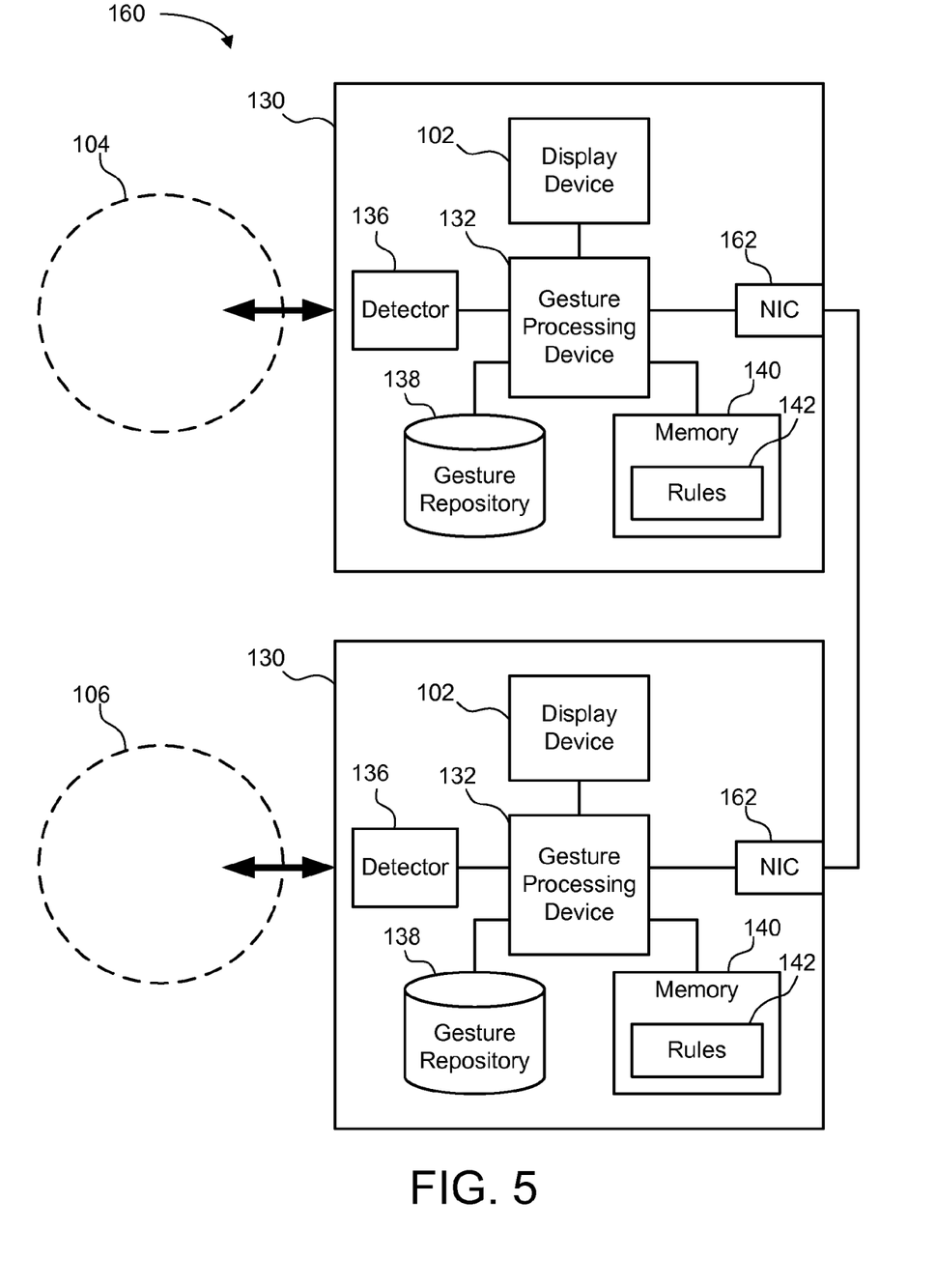
FIG. 5 depicts schematic diagram of one embodiment of a network of the gesture systems of FIG. 3.

FIG. 5 depicts schematic diagram of one embodiment of a network 160 gesture systems 130. In the illustrated embodiment, each of the gesture systems 130 additionally includes a network interface card (NIC) 162. The NIC 162 facilitates communications (e.g., wired or wireless using any available protocol) between the gesture systems 130.

In the illustrated embodiment, one gesture system 130 monitors the participant gesture sphere 104 and the other gesture system 130 monitors the guide gesture sphere 106. This may allow the guide user 110 and the participant user 108 to be in separate locations while still maintaining the ability to collaboratively operate in a guide mode, in a training setting, in a teaching application, or in a supervisory capacity. One application of this embodiment may be in a classroom setting where a teacher uses one gesture system 130 at the front of a classroom, while students use one or more separate networked gesture systems 130 at student locations within the classroom.

In another example, where the guide user 110 is located at a separate location from the participant user(s) 108, the detector 136 of the corresponding gesture system 130 may additionally be used to generate and transmit video of the guide user 110 to the gesture system(s) 130 of the participant user(s) 108. Other embodiments may include more gesture systems 130 or other methods of communication between the gesture systems 130.

Figure 6:
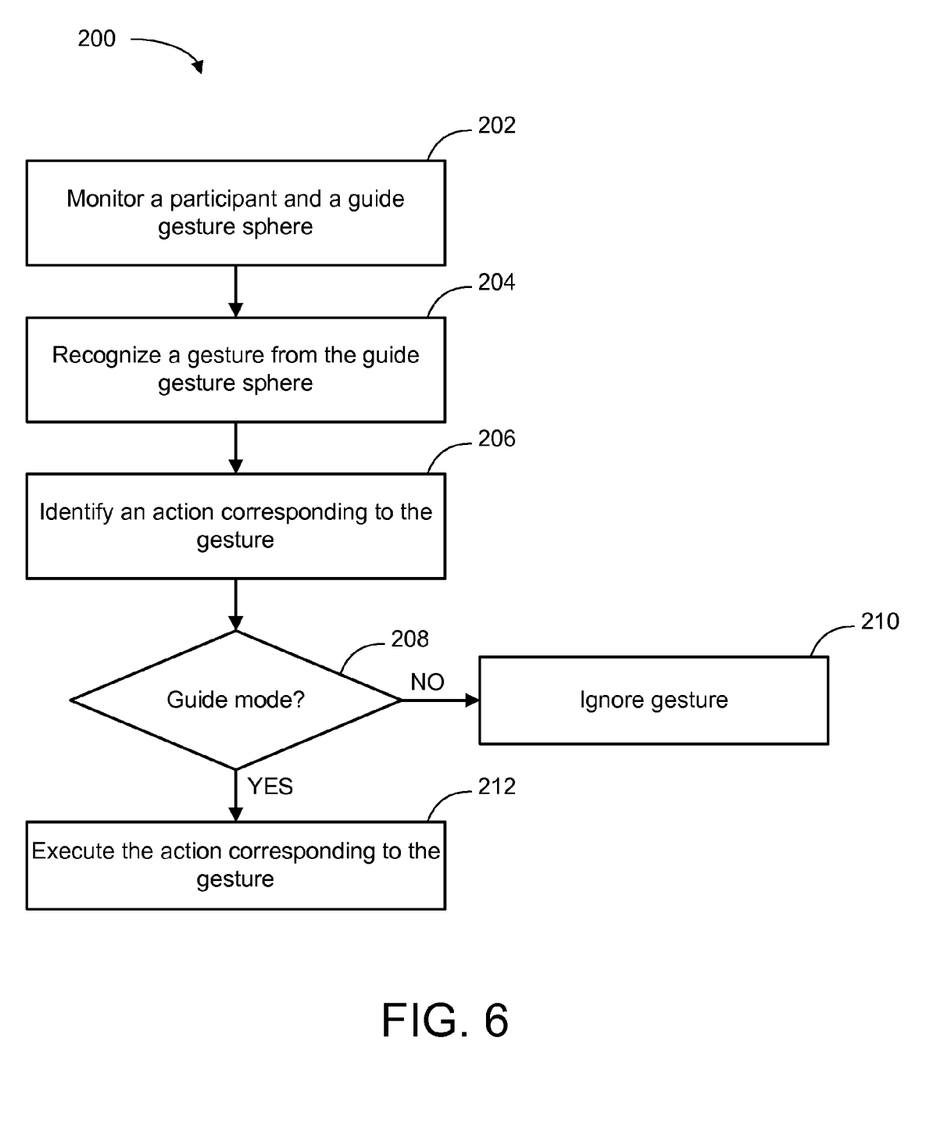
FIG. 6 depicts a flow chart diagram of one embodiment of a method for operating a gesture system.

FIG. 6 depicts a flow chart diagram of one embodiment of a method 200 for operating a gesture system 130. Although the method 200 is described in conjunction with the gesture system 130 of FIG. 4, embodiments of the method 200 may be implemented with other types of gesture systems, including networked gesture systems similar to the arrangement of FIG. 5.

In the depicted method 200, the detector 136 monitors 202 a participant gesture sphere 104 and a guide gesture sphere 106. The gesture processing device 132 recognizes 204 a gesture input from the guide gesture sphere 106. The processing device 132 identifies an action corresponding to the gesture input, for example by referencing the gesture repository 138. The gesture processing device 132 also determines 208 if the gesture system 130 is operating the guide mode. If the gesture system 130 is not operating in guide mode, then the gesture input from the guide gesture sphere 106 may be ignored 210. If the gesture system 130 is operating in the guide mode, then the gesture system 130 executes 212 the action corresponding to the gesture input from the guide gesture sphere 106. The depicted method 200 then ends.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product, comprising:
   a non-transitory computer readable storage medium to store a computer readable program, wherein the computer readable program, when executed by a processor within a computer, causes the computer to perform operations for a guide mode for a gesture system, the operations comprising:
   calibrating a participant gesture sphere for a first user and a separate guide gesture sphere for a second user, the participant gesture sphere partially overlapping the guide gesture sphere, wherein the first user and the second user share a common display device;
   monitoring the participant gesture sphere and the guide gesture sphere, wherein the participant gesture sphere corresponds to a participant domain on a display device;
   recognizing a gesture from the guide gesture sphere;
   identifying an action corresponding to the gesture;
   determining if the gesture system is operating in a guide mode;
   executing the action corresponding to the gesture from the guide gesture sphere within the participant domain in response to a determination that the gesture system is operating in the guide mode; and
   ignoring gesture input from the first user in the participant gesture sphere in response to a determination that the gesture system is operating in the guide mode.

2. The computer program product of claim 1, wherein the computer program product, when executed on the computer, causes the computer to perform additional operations, comprising:
   recognizing a gesture from the participant gesture sphere;
   identifying an action corresponding to the gesture from the participant gesture sphere; and
   executing the action corresponding to the gesture from the participant gesture sphere within the participant domain while the gesture system is operating in the guide mode.

3. The computer program product of claim 1, wherein the computer program product, when executed on the computer, causes the computer to perform additional operations, comprising disallowing access from the participant gesture sphere to the participant domain while the gesture system is operating in the guide mode.

4. The computer program product of claim 1, wherein monitoring the guide gesture sphere and the participant gesture sphere further comprises monitoring the guide gesture sphere and the participant gesture sphere using images from a single detector.

5. The computer program product of claim 1, wherein monitoring the guide gesture sphere and the participant gesture sphere further comprises:
   monitoring the participant gesture sphere using images from a first detector; and
   monitoring the guide gesture sphere using images from a second detector.

6. The computer program product of claim 1, wherein the computer program product, when executed on the computer, causes the computer to perform additional operations, comprising storing data on an electronic data memory device for use with the gesture system, wherein the stored data comprises:
   parameters for configuration of the gesture system; and
   instructions for processing gesture inputs from the participant gesture sphere and the guide gesture sphere.

7. The computer program product of claim 6, wherein the instructions for processing the gesture inputs comprise:
   instructions for identifying conflicting gesture inputs from an overlap of the participant gesture sphere and the guide gesture sphere; and
   instructions for processing the conflicting gesture inputs according to a priority rule.

8. A gesture system comprising:
   a processor and memory;
   a detection subsystem to monitor a plurality of gesture spheres, wherein the plurality of gesture spheres comprises:
   a participant gesture sphere for a first user, wherein the participant gesture sphere corresponds to a participant domain on a display device; and
   a separate guide gesture sphere for a second user, and wherein the participant gesture sphere partially overlaps the guide gesture sphere; and
   a gesture processing device coupled to the detection subsystem, wherein the gesture processing device is configured to calibrate, by the processor, the participant gesture sphere and guide gesture sphere, wherein the first user and the second user share the display device, and implement a guide mode to execute an action within the participant domain based on a gesture from the guide gesture sphere, and ignore a gesture from the first user in the participant gesture sphere in response to a determination that the gesture processing device is operating in the guide mode.

9. The gesture system of claim 8, further comprising an electronic data memory device to store data for use with the gesture system, wherein the stored data comprises:
   parameters for configuration of the gesture system; and
   instructions for processing gesture inputs from the participant gesture sphere and the guide gesture sphere.

10. The gesture system of claim 9, wherein the gesture processing device is further configured to allow a user configuration of the parameters to establish at least one property of the participant gesture sphere and the guide gesture sphere and to allow the user to set access parameters to determine whether gesture inputs from each of the participant and guide gesture spheres can be used to implement corresponding actions in each of the participant and guide gesture domain.

11. The gesture system of claim 9, wherein the instructions for processing the gesture inputs comprise:
   instructions for identifying conflicting gesture inputs from an overlap of the participant gesture sphere and the guide gesture sphere; and
   instructions for processing the conflicting gesture inputs according to a priority rule.

12. A method for operating a gesture system, the method comprising:
   calibrating a participant gesture sphere for a first user and a separate guide gesture sphere for a second user, the participant gesture sphere partially overlapping the guide gesture sphere, wherein the first user and the second user share a common display device;
   monitoring the participant gesture sphere and the guide gesture sphere, wherein the participant gesture sphere corresponds to a participant domain on a display device;
   recognizing a gesture from the guide gesture sphere;

identifying an action corresponding to the gesture from the guide gesture sphere;

determining if the gesture system is operating in a guide mode;

executing the action corresponding to the gesture from the guide gesture sphere within the participant domain in response to a determination that the gesture system is operating in the guide mode; and ignoring gesture input from the first user in the participant gesture sphere in response to a determination that the gesture system is operating in the guide mode.

13. The method of claim 12, further comprising:

recognizing a gesture from the participant gesture sphere;

identifying an action corresponding to the gesture from the participant gesture sphere; and executing the action corresponding to the gesture from the participant gesture sphere within the participant domain while the gesture system is operating in the guide mode.

14. The method of claim 12, further comprising disallowing access from the participant gesture sphere to the participant domain while the gesture system is operating in the guide mode.

15. The method of claim 12, wherein monitoring the guide gesture sphere and the participant gesture sphere further comprises monitoring the guide gesture sphere and the participant gesture sphere using images from a single detector.

16. The method of claim 12, wherein monitoring the guide gesture sphere and the participant gesture sphere further comprises:

monitoring the participant gesture sphere using images from a first detector; and monitoring the guide gesture sphere using images from a second detector.

17. The method of claim 12, further comprising storing data on an electronic data memory device for use with the gesture system, wherein the stored data comprises:

parameters for configuration of the gesture system; and instructions for processing gesture inputs from the participant gesture sphere and the guide gesture sphere.

18. The method of claim 17, wherein the instructions for processing the gesture inputs comprise:

instructions for identifying conflicting gesture inputs from an overlap of the participant gesture sphere and the guide gesture sphere; and instructions for processing the conflicting gesture inputs according to a priority rule.

\* \* \* \* \*